(12) United States Patent
Matsuzaki et al.

(10) Patent No.: US 7,739,519 B2
(45) Date of Patent: Jun. 15, 2010

(54) SECURE DEVICE

(75) Inventors: Natsume Matsuzaki, Mino (JP); Kazuo Sakushima, Kawasaki (JP); Makoto Tatebayashi, Takarazuka (JP)

(73) Assignee: Panasonic Corporation, Osaka (JP)

( * ) Notice: Subject to any disclaimer, the term of this patent is extended or adjusted under 35 U.S.C. 154(b) by 561 days.

(21) Appl. No.: 11/802,860

(22) Filed: May 25, 2007

(65) Prior Publication Data

US 2007/0234074 A1    Oct. 4, 2007

Related U.S. Application Data

(62) Division of application No. 10/385,542, filed on Mar. 12, 2003, now Pat. No. 7,246,247.

(30) Foreign Application Priority Data

Mar. 13, 2002    (JP)    ............................... 2002-068097

(51) Int. Cl.
*H04L 9/32* (2006.01)
*G06F 11/30* (2006.01)
*H04L 9/00* (2006.01)

(52) U.S. Cl. .................. 713/193; 713/194; 713/189; 713/190; 713/191; 726/26; 726/27; 726/28; 726/29; 726/30

(58) Field of Classification Search .................. 713/193
See application file for complete search history.

(56) References Cited

U.S. PATENT DOCUMENTS

| 4,184,201 A | 1/1980 | Melberg et al. |
| 4,713,753 A | 12/1987 | Boebert et al. |
| 4,962,533 A | 10/1990 | Krueger et al. |
| 5,226,137 A | 7/1993 | Bolan et al. |
| 5,237,609 A | 8/1993 | Kimura |
| 5,384,748 A | 1/1995 | Sanemitsu |
| 5,749,088 A | 5/1998 | Brown et al. |
| 5,987,607 A | 11/1999 | Tsumura |

(Continued)

FOREIGN PATENT DOCUMENTS

EP    0 451 936    10/1991

(Continued)

OTHER PUBLICATIONS

Jun Miyake et al., "Secure MultiMediaCard for Content Distribution and Mobile Commerce", Hitachi Hyoron, Oct. 2001, pp. 9-14.

(Continued)

*Primary Examiner*—Longbit Chai
(74) *Attorney, Agent, or Firm*—Wenderoth, Lind & Ponack, L.L.P.

(57) ABSTRACT

A secure device is provided that can store programs therein, the secure device including: a low-protection level storage unit; a high-protection level storage unit; a program acquiring unit that acquires a program and corresponding additional information, the additional information used for determining a storage destination of the acquired program; an additional information analyzing unit that stores the acquired program in one of the low-protection level storage unit and the high-protection level storage unit, according to additional information; an area searching unit; a protection level judging unit; and a program storing unit.

4 Claims, 7 Drawing Sheets

U.S. PATENT DOCUMENTS

| | | |
|---|---|---|
| 6,018,724 A | 1/2000 | Arent |
| 6,115,819 A | 9/2000 | Anderson |
| 7,073,073 B1 | 7/2006 | Nonaka et al. |
| 7,162,645 B2 | 1/2007 | Iguchi et al. |
| 2003/0027465 A1 | 2/2003 | Trossell et al. |

FOREIGN PATENT DOCUMENTS

| | | |
|---|---|---|
| GB | 2 329 499 | 3/1999 |
| JP | 9-297798 | 11/1997 |
| JP | 10-27135 | 1/1998 |
| JP | 2001-195308 | 7/2001 |
| JP | 2002-229861 | 8/2002 |
| RU | 2 134 931 | 8/1999 |
| RU | 2163744 | 2/2001 |

OTHER PUBLICATIONS

P. Dwyer et al., "Query Processing in LDV: A Secure Database System", Proceedings of the Aerospace Computer Security Applications Conference, Orlando, Dec. 12-16, 1988, Washington, IEEE Comp. Soc. Press, US, vol. Conf. 4, Dec. 12, 1988, pp. 118-124, XP010014552, ISBN: 0-8186-0895-1.

SECURE DEVICE

This application is a divisional of application Ser. No. 10/385,542, filed Mar. 12, 2003 now U.S. Pat. No. 7,246,247.

FIELD OF INVENTION

The present invention relates to a secure device equipped with a technology of preventing an unauthorized use of content, and with a technology of preventing fraud in electronic commerce (mobile EC).

BACKGROUND ART

Recently, various types of electronic information services for distributing music content and moving image content through a network such as the Internet have become prevalent. Examples of such electronic information services are a content distributing service and a mobile EC service.

Such electronic information services necessitate a content protection technology for preventing unauthorized use of content, and an EC protection technology such as an authentication technology and a billing technology at the mobile ECs. Accordingly, secure devices equipped with such technologies have already been developed and are in use.

Users, for example, mount such secure a device to their mobile telephone, to securely perform content distribution services and mobile EC services, for example, from the road.

For detailed information on the secure devices, "Secure multimedia card for content distribution and mobile commerce" The Hitachi Hyoron October, 2001, an extra issue, by MIYAKE Jun, ISHIHARA Harutsugu, and TSUNEHIRO Takashi, describes a secure multimedia card (hereinafter abbreviated as "SMMC") equipped with a content protection technology and an EC protection technology.

There are SMMCs that are equipped with a program download function, one example of which is a JAVA Card (JAVA is a registered trademark). Programs to be downloaded here are such as a new application program and an updated version of the program already implemented on the card.

An SMMC equipped with a program download function includes, in its TRM (tamper resistant module), a cryptographic processing engine, security key information, a CPU, a RAM, a ROM, and an EEPROM. The SMMC further includes, outside the TRM, a flash memory that is large in capacity (e.g. in the range of 8 MB and 256 MB). In the SMMC, the CPU controls authentication processes and cryptographic processes, for example, using the cryptographic processing engine and the security key information. Further, the CPU acquires programs to be downloaded from an external device, and stores the acquired programs in the EEPROM mounted in the TRM, for performing the programs.

Here, the TRM is a module equipped with measures preventing external devices from performing unauthorized references, tampering, and the like, directed to data stored in the module.

Further, in the flash memory, various types of digital data such as music content and moving image content that are content of distribution are stored.

The EEPROM mounted in the TRM is an expensive device in terms storage capacity costs, compared to other memories. Accordingly, an increase in capacity of the EEPROM will have a great impact on the cost of the SMMC. In addition, from the characteristics of the device, the capacity of the EEPROM mountable to the TRM is limited; the standard capacity of EEPROM according to the current structure is about 64 KB.

Meanwhile, the application programs to be downloaded to the SSMC are expected to increase greatly in the future. In light of these factors, it will certainly become impossible to store the necessary application programs in the EEPROM of the TRM with the current structure.

There is a method of storing application programs that the EEPROM of the TRM cannot accommodate onto the flash memory outside the TRM. However, indiscriminate use of this method is not practical from a security point of view, and at least an approval from an administrator of each program is essential. To implement such a system, a new technology is desired for assuring security.

The object of the present invention is to provide a secure device that downloads a program exceeding the capacity of the storage area implemented on the TRM, while assuring security desired by the administrator of the program.

SUMMARY OF THE INVENTION

The secure device according to the present invention includes: a plurality of storage units each having a storage area; an acquiring unit operable to acquire digital data and destination information in correspondence, the destination information being used for determining a storage unit as a storage destination of the digital data; and a processing unit operable to store the digital data in a storage unit determined based on the destination information.

Where a secure device has a plurality of storage units that each include a storage area, the storing method for the secure device according to the present invention includes: acquiring digital data and destination information in correspondence, the destination information being used for determining a storage unit as a storage destination for the digital data; and storing the digital data in the storage unit designated based on the destination information.

By the stated structures, the administrator of each piece of digital data is able to set destination information for the digital data. This is useful when there is a lack in capacity of the storage units having a high protection level such as the EEPROM mounted within the TRM. Specifically in such a case, the digital data is able to be stored in a storage unit having a low protection level such as the flash memory mounted outside the TRM, if it is in accordance with the destination information set by the administrator. Therefore, the structures provide the ability to store digital data efficiently, according to its value.

Therefore, when downloading a program exceeding the capacity of the storage area mounted on the TRM, the downloading can be realized while ensuring the security required by the administrator.

Furthermore, in the stated secure device, each of the plurality of storage units may correspond to a protection level, the destination information may specify a protection level required for the digital data, and the processing unit may be operable to determine a storage unit corresponding to a protection level that is the same as the protection level specified by the destination information, as the storage destination for the digital data.

According to the structure, the administrator of each piece of digital data is able to set a protection level required for the digital data, so as to determine, as the storage destination for the digital data, the storage unit corresponding to the same protection level as the protection level of the digital data. This structure provides the ability to store digital data efficiently, according to its value.

Furthermore, in the stated secure device, each of the plurality of storage units may correspond to a protection level, the destination information may specify a protection level required for the digital data, and the processing unit may be operable to determine a storage unit corresponding to a protection level which is no lower than the protection level specified by the destination information, as the storage destination for the digital data.

According to the structure, the administrator of each piece of digital data is able to set a protection level required for the digital data, so as to determine, as the storage destination for the digital data, the storage unit corresponding to a protection level no lower than the protection level of the digital data. This structure provides the ability to store digital data efficiently, according to its value.

In addition, in the secure device, the processing unit may further include: a searching subunit operable, among storage units corresponding to protection levels no lower than the protection level specified by the destination information, to search for all storage units that have a free storage area to accommodate the digital data; a determining subunit operable to determine a storage unit corresponding to the highest protection level of all the storage units found to have a free storage area to accommodate the digital data, to be a storage destination of the digital data; and a storing subunit operable to store the digital data in the storage unit determined by the determining subunit.

The above structure provides the ability to determine, as the storage destination, a storage unit having the highest protection level among the storage units having an available storage area. Therefore, each piece of digital data is stored, as securely as possible.

In addition, in the secure device, the processing unit may further include: an outputting subunit operable, if no storage unit has been found by the searching subunit, to output error information to present to a user that the digital data is unable to be stored.

The above structure enables, when there is no available storage area, to display to users that the digital data is unable to be stored.

In addition, in the secure device, the processing unit may further include: a moving subunit operable, if no storage unit has been found by the searching unit, to (1) read destination information corresponding to each of digital data already stored in any of the plurality of storage units corresponding to a protection level no lower than a first protection level, the first protection level being the protection level specified by the destination information added to the digital data acquired at the acquiring unit, (2) extract, from the read destination information, destination information specifying a lower protection level than the first protection level, and (3) move digital data corresponding to the extracted destination information to a storage unit corresponding to a protection level which is lower than the first protection level and no lower than each of the protection levels specified by the extracted destination information, in order to allocate a storage area to the acquired digital data, and the storing subunit may be operable to store the acquired digital data in the storage area allocated by the moving subunit.

According to the above structure, digital data already stored can be moved in accordance with its destination information, in order to allocate a storage area for a new piece of digital data. Therefore, the structure provides the ability to store each piece of digital data efficiently, according to its value.

In addition, in the secure device, the processing unit may further include: an outputting subunit operable, if the moving subunit cannot allocate a storage area, to output error information to present to a user that the acquired digital data is unable to be stored.

According to the structure, when a storage area has not been allocated even if digital data already stored has been moved, the user will be informed that there is no room for the new digital data.

In addition, in the secure device, each of the plurality of storage units may correspond to a protection level, the destination information may specify a protection level required for the digital data and is further used to determine whether the storage destination for the digital data should be a storage unit having the same protection level as the destination information, or any one of storage units each corresponding to a protection level no lower than the protection level specified by the destination information, and the processing unit may be operable to determine, according to the destination information, the storage unit corresponding to the same protection level as the destination information or one of the storage units which corresponds to a protection level no lower than the protection level specified using the destination information, as the storage destination for the digital data.

According to the structure, the administrator of each piece of digital data may set whether the digital data should be stored in the storage unit having the same protection level as the digital data, or in one of the storage units having no smaller protection level than the digital data. This allows greater setting flexibility.

In addition, in the secure device, the destination information may specify whether, prior to the digital data being stored in the secure device, the storage destination for the digital data can be decided arbitrarily, and the processing unit may be operable to store, according to the destination information, the digital data either in an arbitrarily decided storage unit, or in a storage unit determined based on the destination information.

According to the structure, the administrator of each piece of digital data may set whether the storage destination of the digital data may be determined arbitrarily within the secure device. This allows greater setting flexibility.

In addition, in the secure device, each of the plurality of storage units may correspond to a protection level, the destination information may specify whether to encrypt the digital data before storing the digital data in a storage unit corresponding to a lower protection level than a predetermined protection level, and the processing unit may be operable to selectively encrypt the digital data before storing the digital data in the lower-protection level storage unit, according to the destination information. According to the structure, the administrator of each piece of digital data may set whether to encrypt the digital data when storing the digital data in a storage unit having lower protection level as a predetermined protection level. This allows greater setting flexibility.

Furthermore, if a key unique to each secure device is used in such encryption, digital data stored in a storage unit having low protection level such as a flash memory will be protected from attacks of a third person such as trying to pursue an unauthorized copy of the digital data to another secure device.

That is, even when such unauthorized copying to another secure device is performed, the key used in the another secure device is different and is unable to decrypt correctly, and therefore it blocks the unauthorized use of the digital data.

In addition, in the secure device, each of the plurality of storage units may correspond to a protection level, the destination information may specify whether to add a message authentication code to the digital data when storing the digital data in a storage unit having a lower protection level than a predetermined protection level, and the processing unit may be operable to selectively add a message authentication code to the digital data before storing the digital data in the lower-protection level storage unit, according to the destination information.

According to the structure, the administrator of each piece of digital data is able to set whether to add, to the digital data, a message authentication code, at a time when storing the digital data in a storage unit having lower protection level than a predetermined protection level. This allows greater setting flexibility.

In addition, if such a message authentication code is added before storing the digital data, attacks will be prevented such as unauthorized use of digital data stored in a storage unit having a low protection level such as a flash memory, which would be realized by tampering of the digital data or of the corresponding destination information.

This means that, even when the digital data or the corresponding destination information has been tampered with, the fact will be detected by performing an authenticating processing. Therefore, when tampering is detected, use of the digital data can be prohibited.

Furthermore, in the secure device, each of the plurality of storage units may correspond to a protection level, the destination information may specify whether to embed a digital signature when storing the digital data in a storage unit having a lower protection level than a predetermined protection level, and the processing unit may be operable to selectively embed the digital signature on the digital data before storing the digital data in the lower-protection level storage unit, according to the destination information.

According to the structure, the administrator of a piece of digital data can set whether to embed, on the digital data, a digital signature when storing the digital data in a storage unit having a lower protection level than a predetermined protection level. This allows greater setting flexibility.

In addition, if such a digital signature is embedded before being stored, attacks will be prevented such as unauthorized use of digital data stored in the storage unit having a low protection level such as a flash memory, that would be realized by tampering with the digital data or of the corresponding destination information.

This means that, even when the digital data or the corresponding destination information has been tampered with, the fact will be detected by performing an authenticating processing. Therefore, if tampering is detected, use of the digital data can be prohibited.

Furthermore, in the secure device, each of the plurality of storage units may correspond to a protection level, the destination information may specify a priority level of the digital data acquired at the acquiring unit, at least one storage unit may already store digital data thereon, each piece of the digital data already stored may correspond to a priority level, the already stored digital data may be stored in the plurality of storage units in a state that digital data having a higher priority level is stored in a storage unit corresponding to higher protection level, and the processing unit may be operable to store the acquired digital data in a storage unit, according to a priority level specified by the destination information and so as to maintain the state at which the digital data having a higher priority level is stored in a storage unit corresponding to the higher protection level.

According to the structure, the administrator of a piece of digital data may set a priority level of the digital data, in order that the digital data can be stored in a storage unit according to the level of priority. Therefore, the structure realizes an efficient storing of digital data.

Furthermore, in the secure device, each piece of the digital data already stored may be added thereto destination information specifying a priority level, and the processing unit may further include: a moving subunit operable, for the plurality of storage units, in sequence beginning from a storage unit corresponding to the highest protection level, to (1) judge whether any of the plurality of storage units has a free storage area to accommodate the acquired digital data, (2) read, when the judgment result is negative, destination information added to the digital data stored in the storage unit, (3) extract every piece of destination information specifying a lower priority level than the priority level specified by the destination information added to the acquired digital data, (4) move digital data corresponding to the extracted destination information to a storage unit corresponding to a lower protection level than a protection level specified by the extracted destination information, (5) repeat (1)-(4) until an affirmative judgment result is obtained in order to allocate a storage area for the acquired digital data; and a storing subunit operable to store the acquired digital data in the storage area allocated by the moving subunit.

According to the structure, digital data already stored may be moved according to the priority level of the digital data, so that a storage area having a protection level as high as possible may be allocated for a new piece of digital data. Therefore, each piece of digital data may be stored as securely as possible.

Furthermore, in the secure device, the destination information read by the moving subunit may specify whether digital data corresponding to the read destination information should be encrypted if being moved, and the moving subunit may be operable to selectively encrypt digital data to be moved, according to the destination information added to the digital data to be moved, and to move the digital data to be moved.

According to the structure, the administrator of each piece of digital data may set whether the digital data, when being moved, should be encrypted. This allows greater setting flexibility.

In addition, if a key unique to each secure device is used in such encryption, digital data moved to a storage unit having a low protection level such as a flash memory will be protected from attacks of a third person, such as trying to copy an unauthorized copy of the digital data to another secure device.

That is, even when such unauthorized copying to another secure device is performed, the key used in the another secure device is different and is unable to decrypt correctly, and therefore it blocks the unauthorized use of the digital data.

Furthermore, in the secure device, the destination information read by the moving subunit may specify whether digital data corresponding to the read destination information should add a message authentication code if being moved, and the moving subunit may be operable to selectively add a message authentication code to digital data to be moved, according to the destination information corresponding to the digital data to be moved, and to move the digital data to be moved.

According to the structure, the administrator of each piece of digital data may set whether the digital data, when being moved, should add a message authentication code. This allows greater setting flexibility.

In addition, if such a message authentication code is added before moving the digital data, attacks will be prevented such as unauthorized use of digital data moved to a storage unit having a low protection level such as a flash memory, that would be realized by tampering of the digital data or of the corresponding destination information.

That is, even if the digital data or the destination information has been tampered with, the fact will be detected by performing an authenticating processing. Therefore, if tampering is detected, use of the digital data can be prohibited.

Furthermore, in the secure device, the destination information read by the moving subunit may specify whether a digital signature should be embedded in digital data corresponding to the read destination information if being moved, and the moving subunit may be operable to selectively embed a digital signature in digital data if being moved, according to the destination information corresponding to the digital data to be moved, and to move the digital data to be moved.

According to the structure, the administrator of each piece of digital data may set whether a digital signature should be embedded on the digital data, when being moved. This allows greater setting flexibility.

Moreover, if such a digital signature is embedded before moving the digital data, attacks will be prevented such as unauthorized use of digital data moved to a storage unit having low protection level such as a flash memory, that would be realized by tampering with the digital data or of the corresponding destination information.

That is, even if the digital data or the destination information has been tampered with, the fact will be detected by performing an authenticating processing. Therefore, if tampering is detected, use of the digital data can be prohibited.

Furthermore, in the secure device, the destination information may further specify a protection level, the moving subunit may not perform the processings from (1)-(5) for a storage unit corresponding to a lower protection level than the protection level specified by the destination information corresponding to the acquired digital data, and the processing unit may further include an outputting subunit operable to output error information to present to a user that the acquired digital data is unable to be stored, if the moving subunit cannot allocate a storage area.

According to the structure, the administrator of each piece of digital data may further set a protection level to the digital data, in order that the moving processing will not be performed for the storage units having lower protection level than the digital data. This helps assure the security of the digital data.

In addition, when a storage area cannot be allocated, the structure enables to present to the user that there is no room for the new digital data.

Furthermore, in the secure device, the digital data acquired at the acquiring unit may be a computer program that includes a plurality of sub-programs, each sub-program may be added destination information, and the processing unit may be operable to store each sub-program in a storage unit determined based on the destination information added to the sub-program.

According to the structure, the administrator of digital data may set destination information to each sub-program, so that the determination of storage destination may be performed for each sub-program, according to the corresponding destination information. This helps storing each sub-program efficiently, according to the value of the sub-program.

Furthermore, in the secure device, each of the plurality of storage units may correspond to a protection level, the digital data may be a computer program that includes one main routine and sub-routines, the main routine and the sub-routines each are added destination information, destination information corresponding to the main routine specifying that the main routine should be stored in a storage unit corresponding to a high protection level, and the processing unit may be operable to store each routine in a storage unit determined based on the destination information corresponding to the routine.

According to the structure, the administrator of the digital data may set destination information for each routine, in order that the determination of storage destination may be performed for each routine, according to the corresponding destination information. This helps storing each routine efficiently, according to the value of the routine.

In particular, the program will be made harder to read, by storing only the main routine in a storage element having high protection level.

In addition, in the secure device, the digital data may be either embedded in a digital signature or added to an authentication identifier, the digital signature and the authentication identifier showing either 1) correctness of the destination information, or 2) correctness of correspondence between the digital data and the destination information; and the processing unit may be operable to perform authentication according to the digital signature or the authentication identifier, and to store the digital data only if the authentication has been successful.

According to the structure, digital data and the corresponding destination information will not be separated, which heightens security.

DETAILED DESCRIPTION OF THE INVENTION

Overview

In the present invention, the secure device has several types of storage areas each corresponding to a different protection level. The secure device acquires digital data and additional information in correspondence and is used in determining a storage area in which the digital data should be stored, determines the storage area according to the additional information, and stores the digital data in the determined storage area.

More specifically, the SMMC includes two kinds of storage elements: an EEPROM having a high protection level; and a flash memory having a low protection level. The SMMC receives a program and additional information in correspondence, from a server through a mobile telephone, the additional information indicating whether a storage element to store the program is the EEPROM or the flash memory, determines the storage element in accordance with the additional information, and downloads the program to the determined storage element.

(System Structure)

Figure 1:
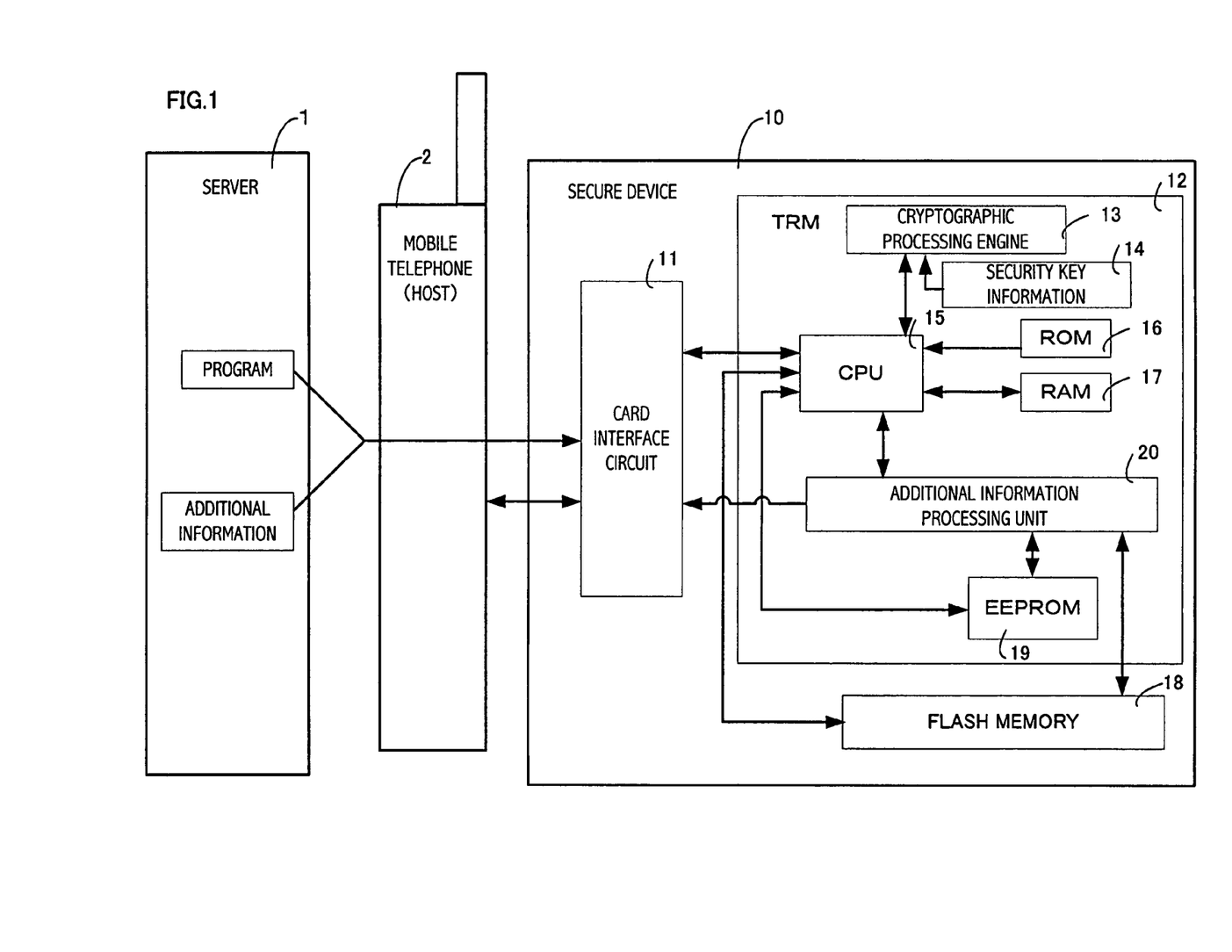
FIG. 1 is a diagram showing a structure of a secure system relating to the first embodiment of the present invention.

FIG. 1 shows a structure of a secure system relating to the first embodiment of the present invention.

As shown in FIG. 1, the secure system is structured by a server 1, a mobile telephone 2, and a secure device 10.

The server 1 prestores additional information for each program, and transmits a program and additional information that are in correspondence through the telephone line to the mobile telephone 2, in accordance with the instructing operation by the operator of the server 1, or with the request operation by the user of the mobile telephone 2.

Here, an example of the additional information is a flag specifying the EEPROM 19 mounted to the TRM 12 or specifying the flash memory 18 mounted outside the TRM 12. Another example is a numerical value specifying a protection level set to each storage element.

The mobile telephone 2 receives a program and additional information in correspondence from the server 1 through the telephone line.

The secure device 10 is an SMMC equipped with a download function, such as a JAVA card, and is mounted by the user for example, to the mobile telephone 2. The secure device 10 receives a program and corresponding additional information received at the mobile telephone 2, determines the EEPROM 19 or the flash memory 18, using the additional information, and downloads the program to the determined storage element.

The size of the secure device is such as that of the conventional SSMC of a stamp size, and that of an IC card. The secure device may also have other forms.

As shown in FIG. 1, the secure device 10 includes, outside the TRM 12, a card interface circuit 11 and a flash memory 18. Inside the TRM 12, the secure device 10 includes a cryptographic processing engine 13, security key information 14, a CPU 15, a ROM 16, a RAM 17, an EEPROM 19, and an additional information processing unit 20.

Here, the program to be downloaded is, for example, a chargeable application program, a program relating to billing information, and an upgraded version of the program already installed in the card, all of which require a certain level of security when used in the secure device 10.

In the present description, the EEPROM 19 implemented in the TRM 12 is described as having a high protection level since it is difficult from any unauthorized external device to access the program stored in the EEPROM 19, and so to perform unauthorized change of data in the EEPROM 19.

On the contrary, the flash memory 18 implemented outside the TRM 12 is described as having a low protection level in the present description, since it is relatively easy from an unauthorized external device to access programs stored in the flash memory 18.

The card interface circuit 11 exchanges data with the mobile telephone 2, and receives a program and corresponding additional information from the mobile telephone 2.

The TRM 12 is a tamper resistant module, which is equipped with measures against unauthorized accesses and tampering from any external devices directed to the data stored therein.

The cryptographic processing engine 13 performs such processing as encrypting a program before the program is stored in the flash memory, and authenticating MAC information (message authentication code information) and a digital signature that have been embedded on the program for ensuring the security of the program.

The security key information 14 is used when the cryptographic processing engine 13 performs cryptographic processes, authenticating processes, and the like.

The additional information processing unit 20 analyzes the meaning of the additional information corresponding to the program received by the card interface circuit 11, and determines whether the storage element in which the program should be stored is the EEPROM 19 or the flash memory 18.

The CPU 15 executes the programs prestored in the ROM 16, controls the cryptographic processing engine 13 and the additional information processing unit 20 using the RAM 17, the flash memory 18, and the EEPROM 19, and downloads programs received at the card interface circuit 11 onto the storage element determined by the additional information processing unit 20.

It should be noted here that the processes described to be executed by the cryptographic processing engine 13 and the additional information processing unit 20 may also be realized by the CPU 15 by executing programs prestored in the ROM 16.

First Embodiment

Structure of the Secure Device

Figure 2:
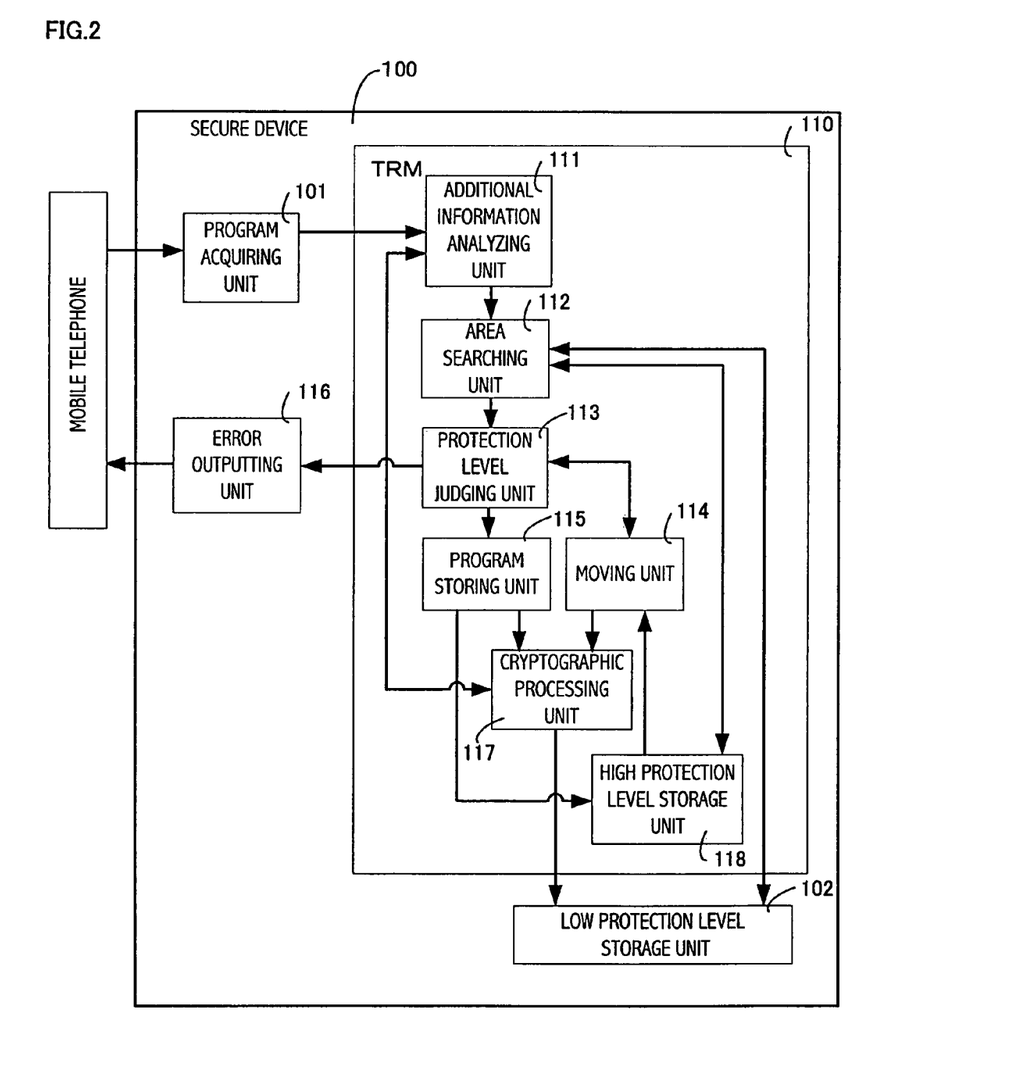
FIG. 2 is a diagram showing a structure of a secure device 100 relating to the first embodiment of the present invention.

FIG. 2 shows a structure of a secure device 100 relating to the first embodiment of the present invention.

The secure device 100 shown in FIG. 2 includes, outside a TRM 110, a program acquiring unit 101 and a low protection level storage unit 102, and includes, inside the TRM 110, a high protection level storage unit 118, an additional information analyzing unit 111, an area searching unit 112, a protection level judging unit 113, a moving unit 114, a program storing unit 115, an error outputting unit 116, and a cryptographic processing unit 117.

The program acquiring unit 101 corresponds to the card interface circuit 11 which is shown in FIG. 1, and acquires a program and corresponding additional information from the mobile telephone.

The low protection level storage unit 102 is a storage element having a low protection level, which is, for example, a flash memory implemented outside the TRM.

The high protection level storage unit 118 is a storage element having a high protection level, which is, for example, an EEPROM implemented in the TRM.

The additional information analyzing unit 111 analyzes additional information corresponding to the program acquired by the program acquiring unit 101, and issues a performance instruction to the area searching unit 112 and to the cryptographic processing unit 117.

The area searching unit 112 searches for a free storage area large enough to accommodate the program acquired at the program acquiring unit 101, within the high protection level storage unit 118 and the low protection level storage unit 102, to judge whether there is such storage area.

The protection level judging unit 113 determines a storage destination for the program acquired by the program acquiring unit 101, by judging whether the storage area found by the area searching unit 112 serves the purpose of the additional information. When necessary, the protection level judging unit 113 instructs the error outputting unit 116 to output error information.

Figure 3:
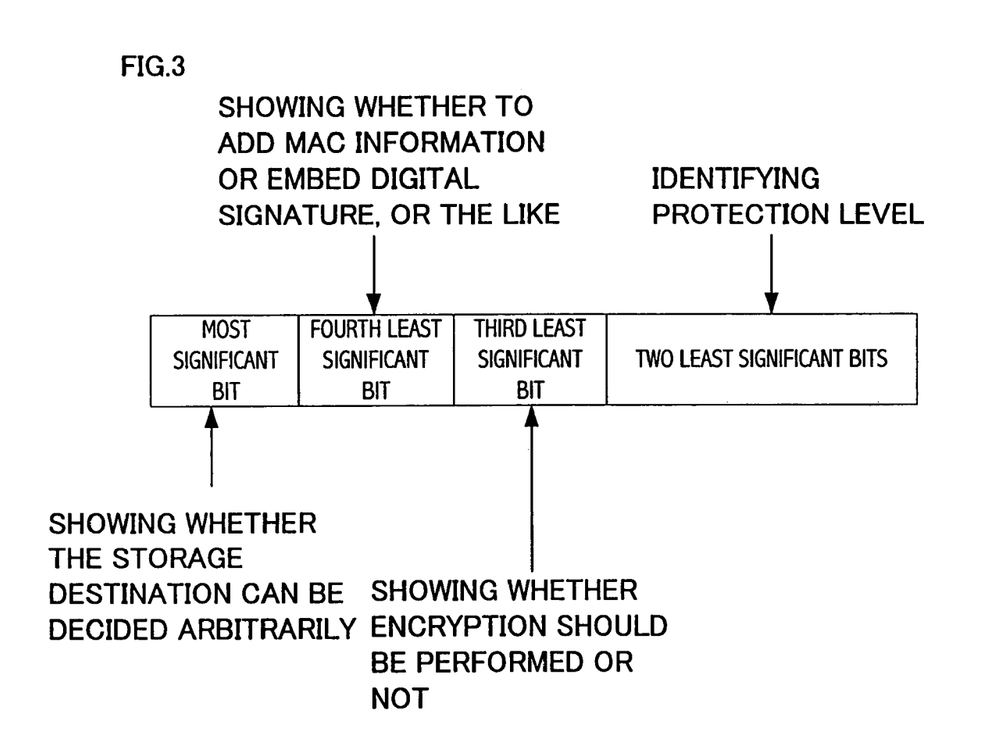
FIG. 3 is a diagram showing additional information of the first embodiment of the present invention.

FIG. 3 illustrates additional information relating to the first embodiment.

As shown in FIG. 3, the additional information is made to have 5 bits in the first embodiment.

The two least significant bits of the additional information identify one of the four protection levels, namely "00", "01", "10", and "11".

When the two least significant bits are "00", it indicates that the corresponding program should be stored in a free storage area of the high protection level storage unit 118, and that if the high protection level storage unit 118 has no such storage area, error information should be issued to the mobile telephone, without storing the program.

When the two least significant bits are "01", it indicates that the corresponding program should be stored in a free storage area of the high protection level storage unit 118, and that if the high protection level storage unit 118 has no such storage area, it is required to make room so that the program can be stored. It should be noted here that the two least significant bits "01" may also be designated to indicate that the storage area of the high protection level storage unit 118 in which another program has been already stored should be overwritten with the corresponding program.

When the two least significant bits are "10", it indicates that the corresponding program should be stored in the low protection level storage unit 102, and that if the low protection level storage unit 102 does not have any available storage area, error information should be sent to the mobile telephone, without storing the program.

When the two least significant bits are "11", it indicates that the corresponding program should be stored in the high protection level storage unit 118 if there is room, and if there is no such room in the high protection level storage unit 118, the program should be stored in the low protection level storage unit 102. And if there is no room in the low protection level storage unit 102 able to accommodate the program, error information should be issued to the mobile telephone.

The third least significant bit in the additional information indicates whether the corresponding program should be encrypted or not, before storing it in the low protection level storage unit 102.

Here, if the third least significant bit is "0", it indicates not to encrypt the program, and if it is "1", it indicates to encrypt the program.

The fourth least significant bit represents whether it is required to add MAC information and embed a digital signature on the corresponding program, in storing the program in the low protection level storage unit 102.

Here, if the fourth least significant bit is "0", it indicates not to add MAC information or embed a digital signature, and if it is "1", it indicates to add MAC information and embed a digital signature.

The most significant bit (i.e. the fifth bit from the low end) of the additional information represents whether the user of the secure device 100 can, at his discretion, decide a place where the corresponding program should be stored (hereinafter occasionally referred to as "the storage destination").

Here, if the most significant bit is "0", it indicates that the user does not have discretion to decide the storage destination, and if the most significant bit is "1", it indicates that the user can decide the storage destination at his discretion, regardless of the protection level indicated by the two least significant bits of the additional information.

When an available storage area is discovered within the high protection level storage unit 118, the protection level judging unit 113 determines the storage area within the high protection level storage unit 118 to be the storage destination, on condition that the most significant bit is "0", and the two least significant bits are one of "00", "01", and "11".

On the contrary, when an available storage area is discovered within the low protection level storage unit 102, the protection level judging unit 113 determines, as the storage destination, the storage area within the low protection level storage unit 102, on condition that the most significant bit is "0", and the two least significant bits are "10". The protection level judging unit 113 also determines, as the storage destination, an available storage area among the low protection level storage unit 102, when an available storage area has not been discovered in the high protection level storage unit 118 but has been discovered in the low protection level storage unit 102, on condition that the most significant bit is "0", and the two least significant bits are "11".

Further, the protection level judging unit 113, when an available storage area is discovered in at least one of the high protection level storage unit 118 and the low protection level storage unit 102, determines either one of the available storage areas as the storage destination, on condition that the most significant bit is "1".

Still further, the protection level judging unit 113 instructs the moving unit 114 to make room within the high protection level storage unit 118, when an available storage area has not been discovered in the high protection level storage unit 118 and that the most significant bit is "0" and the two least significant bits are "01". Please note here, that if, in advance, the two least significant bits "01" are designated to indicate that a storage area in the high protection level storage unit 118 should be overwritten with the corresponding program regardless of the existence of another program in this storage area, this storage area within the high protection level storage unit 118 will be determined as the storage destination for the corresponding program, even if a different program has been already stored in the storage area.

Still further, the protection level judging unit 113 instructs the error outputting unit 116 to output error information, in the following cases: when an available storage area is not discovered in the high protection level storage unit 118, on condition that the most significant bit is "0" and the two least significant bits are "00"; when an available storage area is not discovered in the low protection level storage unit 102, on condition that the most significant bit is "0" and the two least significant bits are "10"; when an available storage area is not found in any of the high protection level storage unit 118 and the low protection level storage unit 102, on condition that the most significant bit is "1", or on condition that the most significant bit is "0" and the two least significant bits are "11".

The moving unit 114, when an available storage area is not discovered in the high protection level storage unit 118 and the most significant bit of the additional information is "0" and the two least significant bits thereof are "01", reads additional information added to each program stored in the high protection level storage unit 118, and extracts the additional information whose most significant bit is "0" or whose two least significant bits are "11", then moves the programs having the extracted additional information to the low protection level storage unit 102, for allocating an available storage area in the high protection level storage unit 118 to store therein the program acquired at the program acquiring unit 101.

Here, if a free storage area having a required capacity is not allocated, the error outputting unit 116 will be instructed to output error information. Note here that in the stated case, arrangement is also possible to determine a storage area within the high protection level storage unit 118 in which another program has been already stored, as the storage destination.

The program storing unit 115 stores a program acquired at the program acquiring unit 101 in the storage destination that has been determined by the protection level judging unit 113 or has been allocated by the moving unit 114.

The error outputting unit 116 returns error information to the mobile telephone, according to an instruction issued by the protection level judging unit 113 which has decided to output error information, and displays, on the display unit of the mobile telephone, that it is impossible to store the digital data.

The cryptographic processing unit 117 stores ID information for each secure device. When storing a program acquired at the program acquiring unit 101 in the low protection level storage unit 102, or when moving the program from the high protection level storage unit 118 to the low protection level storage unit 102, the cryptographic processing unit 117 adds MAC information to the program and embeds a digital signature on the program on condition that the fourth least significant bit of the additional information represents "1", and encrypts the program using the stored ID information, if the third least significant bit of the additional information is "1".

Note here that it is also possible, when storing a program in the high protection level storage unit 118, to make the cryptographic processing unit 117 add MAC information to the program and embed a digital signature on the program if the fourth least significant bit of the additional information is "1", and encrypt the program using the stored ID information if the third least significant bit of the additional information represents "1".

<Operation>

Figure 4:
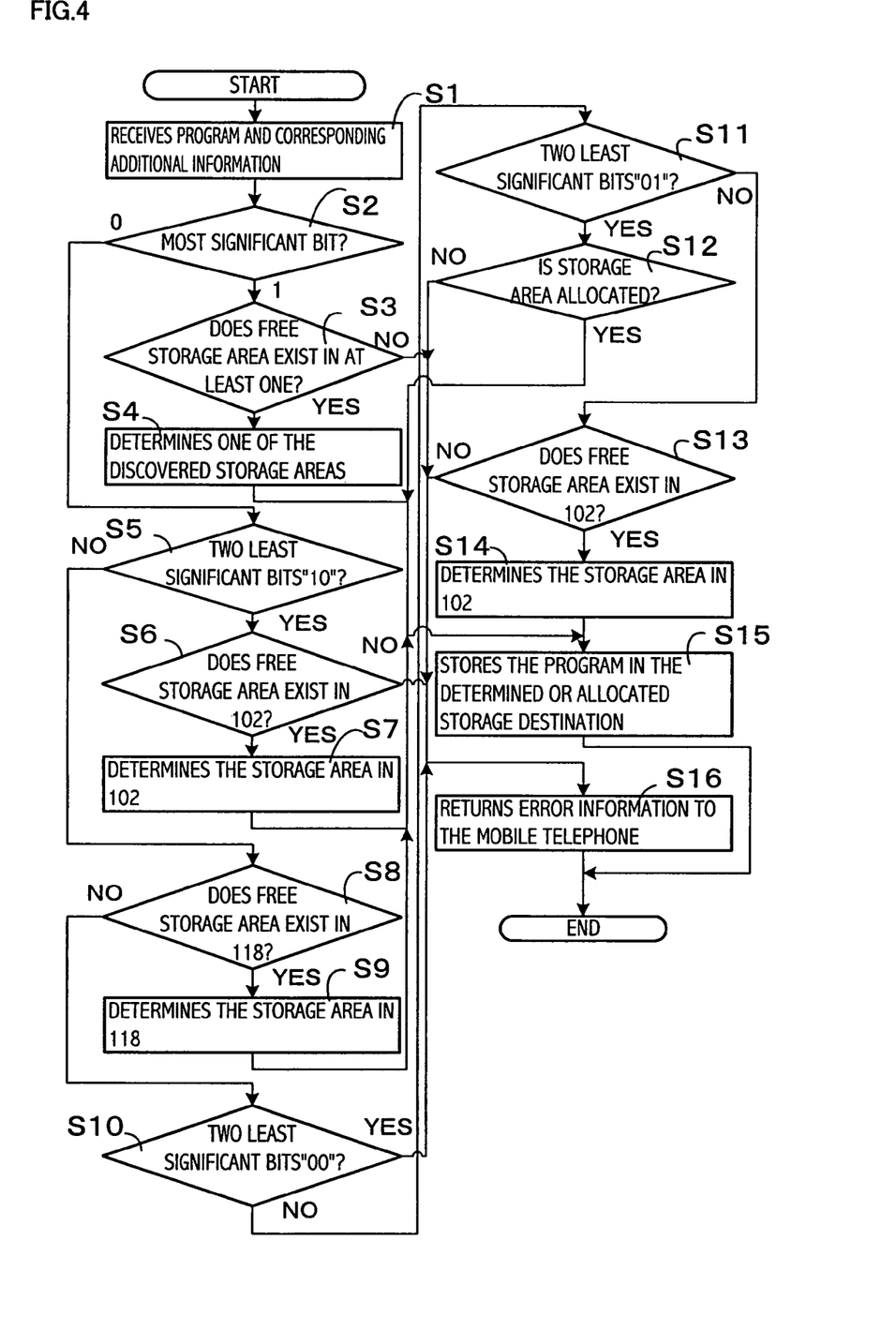
FIG. 4 is a diagram showing how the download processing of the program is operated at the secure device 100 of the first embodiment of the present invention.

FIG. 4 shows how the download processing of a program is operated in the secure device 100 of the first embodiment of the present invention.

The following describes how the download processing of a program is operated.

(1) The program acquiring unit 101 acquires a program and corresponding additional information, from the mobile telephone (S1).

(2) The additional information analyzing unit 111 analyzes whether the most significant bit of the additional information is "0" (S2).

(3) If the most significant bit is "1", the area searching unit 112 searches for a free storage area that can accommodate a program acquired at the program acquiring unit 101, within the high protection level storage unit 118 and the low protection level storage unit 102, to judge whether at least one of the storage units has such available storage area (S3). If such storage area does not exist, an error processing is performed.

(4) If there is at least one storage area discovered, one of the storage areas is determined as the storage destination of the program, according to a direct instruction from the user, or to a preset instruction by the user (S4).

(5) If the most significant bit is "0", the protection level judging unit 113 judges whether the two least significant bits of the additional information are "10" or not (S5).

(6) If the two least significant bits are "10", the area searching unit 112 searches for a free storage area large enough to accommodate the program acquired at the program acquiring unit 101, within the low protection level storage unit 102, to judge whether the low protection level storage unit 102 has such storage area (S6). If such storage area is judged not to exist, an error processing is performed.

(7) If an available storage area is judged to exist, the protection level judging unit 113 determines the storage area as the storage destination (S7).

(8) If the two least significant bits are not "10", the area searching unit 112 searches for a free storage area large enough to store thereon the program acquired at the program acquiring unit 110, in the high protection level storage unit 118 (S8).

(9) If such storage area is judged to exist, the protection level judging unit 113 determines the storage area in the high protection level storage unit 118 as the storage destination (S9).

(10) If such storage area is judged not to exist, the protection level judging unit 113 judges whether the two least significant bits of the additional information show "00" or not (S10). If the two least significant bits are "00", an error processing is performed.

(11) If the two least significant bits are not "00", the protection level judging unit 113 judges whether the two least significant bits are "01" (S11).

(12) If the two least significant bits are "01", the moving unit 114 moves the program stored in the high protection level storage unit 118, to the low protection level storage unit 102, according to the additional information added to the stored program, so as to allocate a storage area in the high protection level storage unit 118 (S12). If such storage area cannot be allocated, an error processing is performed.

Here, if each processing by the cryptographic processing unit 117 has not been performed to the program to be moved from the high protection level storage unit 118, before moving the program, MAC information is added to the program and a digital signature is embedded on the program according to the fourth least significant bit of the additional information, and encryption is performed to the program according to the third least significant bit.

(13) If the two least significant bits are not "01", it means that they are "11". Therefore, the area searching unit 112 searches for a free storage area large enough to store thereon the program acquired at the program acquiring unit 101, within the low protection level storage unit 102 (S13). If such storage area is judged not to exist, an error processing is performed.

(14) If such storage area is judged to exist, the protection level judging unit 113 determines the storage area discovered in the low protection level storage unit 102 as the storage destination (S14).

(15) The program storing unit 115 stores the program in the determined or allocated storage destination (S19).

Here, in storing the program in the low protection level storage unit 102, the additional information analyzing unit 111 analyzes the fourth and third least significant bits of the additional information, and according to the result of analyzing, the cryptographic processing unit 117 adds MAC information and embeds a digital signature, and encrypts the program.

(16) If the storage destination is not discovered or allocated, the error outputting unit 116 returns error information to the mobile telephone (S20).

Second Embodiment

Structure of Secure Device

Figure 5:
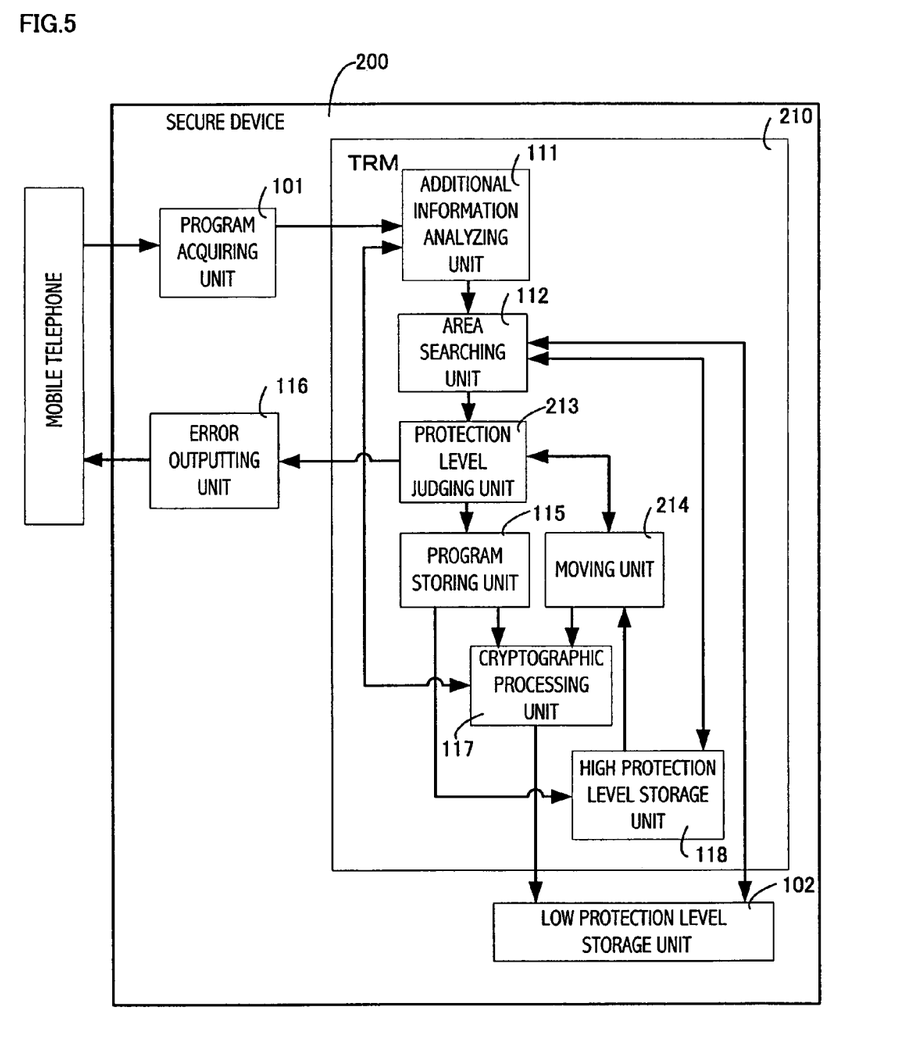
FIG. 5 is a diagram showing a structure of a secure device 200 relating to the second embodiment of the present invention.

FIG. 5 shows a structure of a secure device 200 relating to the second embodiment of the present invention.

Note here that the same components as in the first embodiment are assigned the same reference numerals as in the first embodiment, and the description thereof is omitted in the following description.

The secure device 200 shown in FIG. 5 includes, outside a TRM 210, a program acquiring unit 101 and a low protection level storage unit 102, and includes, within the TRM 210, a high protection level storage unit 118, an additional information analyzing unit 111, an area searching unit 112, a protection level judging unit 213, a moving unit 214, a program storing unit 115, an error outputting unit 116, and a cryptographic processing unit 117.

The protection level judging unit 213 stores programs in the high protection level storage unit 118, from a program having a highest priority in sequence. When there is no more room available in the high protection level storage unit 118, the protection level judging unit 213 uses the low protection level storage unit 102 for storing programs, and when necessary, instructs the error outputting unit 116 to output error information.

Figure 6:
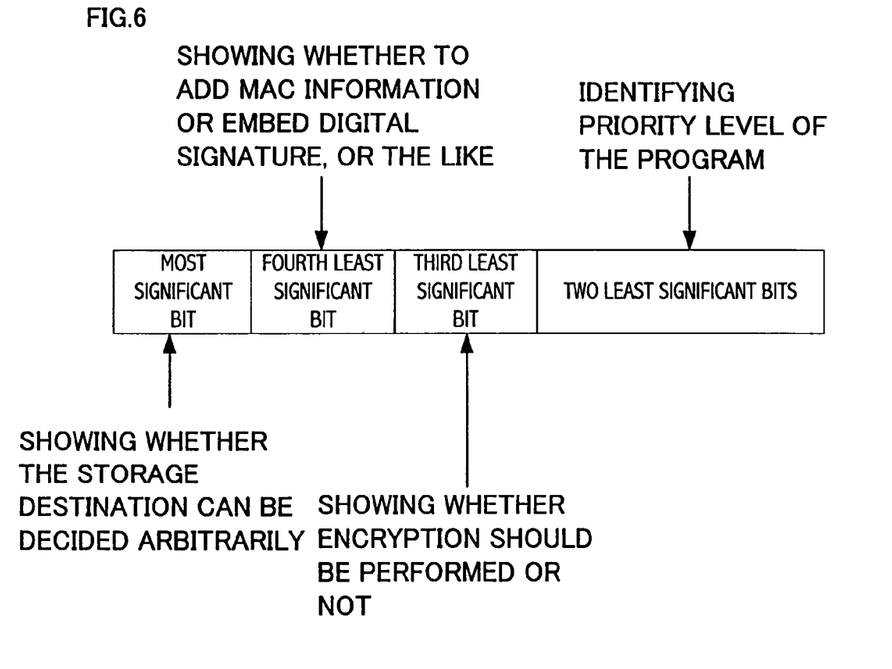
FIG. 6 is a diagram showing additional information of the second embodiment of the present invention.

FIG. 6 shows additional information of the second embodiment.

As shown in FIG. 6, in the second embodiment, additional information is designed to have 5 bits.

The two least significant bits of the additional information are one of "00", "01", "10", and "11", which represent four levels of priority of the corresponding program.

If the two least significant bits are "00", it represents that the priority of the program is the highest.

If the two least significant bits are "01", it represents that the priority of the program is the second highest.

If the two least significant bits are "10", it represents that the priority of the program is the third highest.

If the two least significant bits are "11", it represents that the priority of the program is the lowest of the four levels.

The third, fourth, and most significant bits of the additional information signify the same as in the first embodiment.

Here, the protection level judging unit 213, if an available storage area is discovered in the high protection level storage unit 118, determines the discovered storage area in the high protection level storage unit 118 as the storage destination.

Further, the protection level judging unit 213 instructs the moving unit 214 to make room in the high protection level storage unit 118, when an available storage area has not been discovered in the high protection level storage unit 118 and that the most significant bit of the additional information is "0" and the two least significant bits thereof are one of "00", "01", and "10".

Further, the protection level judging unit 213 determines a discovered storage area in the low protection level storage unit 102 as the storage destination, when an available storage area was not discovered in the high protection level storage unit 118 but was discovered within the low protection level storage unit 102, on condition that the most significant bit of the additional information is "0" and that the two least significant bits are "11".

The moving unit 214, when an available storage area is not discovered in the high protection level storage unit 118, and that the most significant bit of the additional information that the program to be stored is "0" and the two least significant bits are one of "00", "01", and "10", reads additional information added to each program stored in the high protection level storage unit 118, extracts additional information lower in priority than the additional information of the program to be stored, moves programs corresponding to the extracted additional information to the low protection level storage unit 102, in order to allocate a storage area to store therein the program acquired at the program acquiring unit 101, in the high protection level storage unit 118.

Here, if a storage area is failed to be allocated in the high protection level storage unit 118, a storage area should be allocated in the low protection level storage unit 102.

If a storage area cannot be allocated in the low protection level storage unit 102 too, the protection level judging unit 213 instructs the error outputting unit 116 to output error information.

In addition, suppose that an arrangement has been done so that if the second bit from the low end of the additional information is "0", the storing of a program is only permitted to the high protection level storage unit 118. In such a case, the moving unit 214 does not move the program corresponding to the additional information whose second bit from the low end is "0".

When a storage area is not discovered in the high protection level storage unit 118, and when the second bit from the low end of the additional information is "0", the protection level judging unit 213 does not determine a storage area discovered in the low protection level storage unit 102 as the storage destination, and instead, instructs the error outputting unit 116 to output error information.

<Operation>

Figure 7:
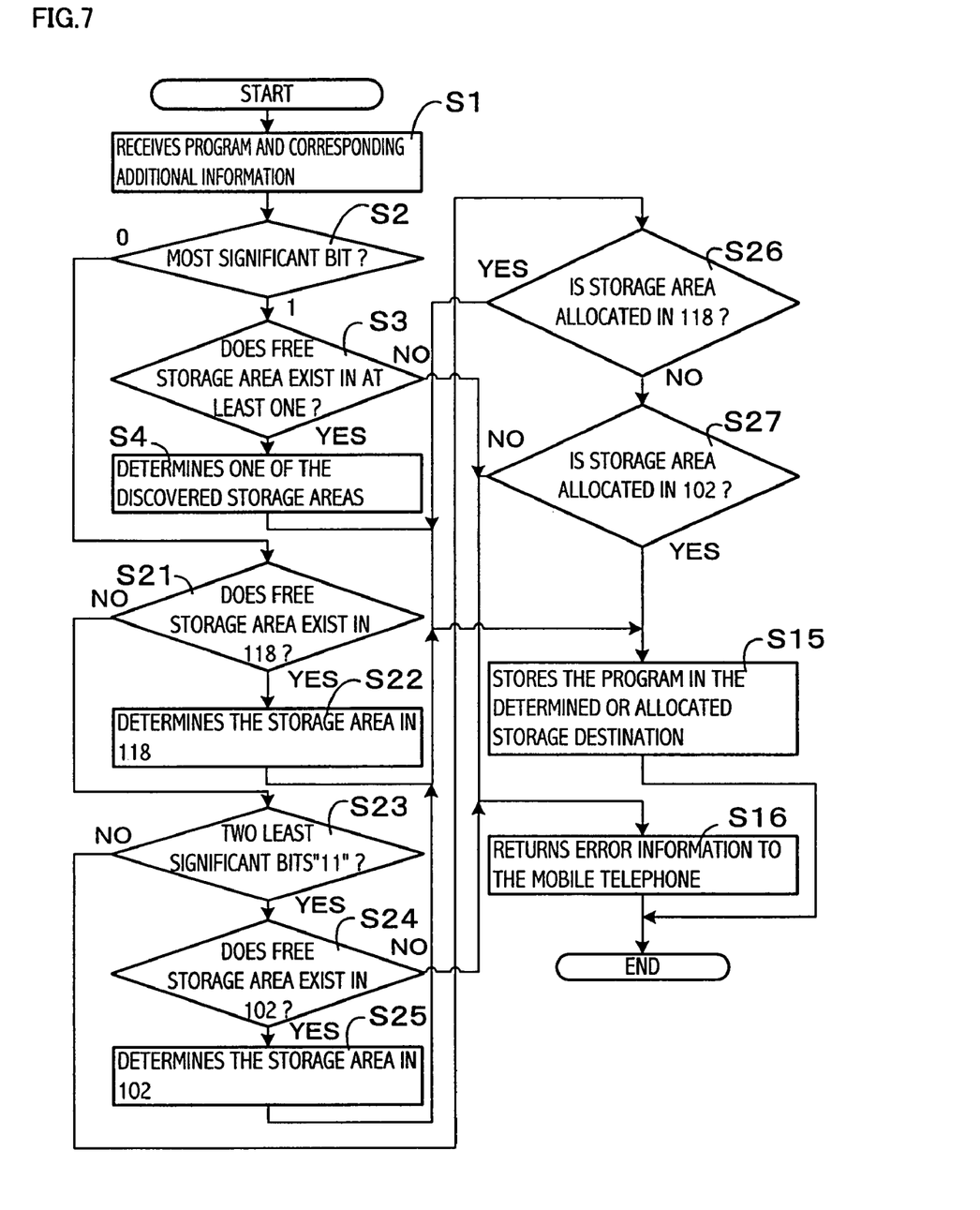
FIG. 7 is a diagram showing how the download processing of the program is operated at the secure device 200 of the second embodiment of the present invention.

FIG. 7 shows how the download processing of a program is performed at the secure device 200 relating to the second embodiment of the present invention.

The following describes how the download processing of a program is operated.

Note here that the steps identical to those in the first embodiment are assigned the same reference numerals, and the description thereof is omitted.

(1) same operation as (1) in the first embodiment.
(2) same operation as (2) in the first embodiment.
(3) same operation as (3) in the first embodiment.
(4) same operation as (4) in the first embodiment.
(5) If the most significant bit is "0", the area searching unit 112 searches for a free storage area large enough to accommodate the program acquired at the program acquiring unit 101, within the high protection level storage unit 118, in order to judge whether the high protection level storage unit 118 has such storage area (S21).
(6) If the storage area exists, the protection level judging unit 113 determines the storage area within the high protection level storage unit 118, as the storage destination (S22).
(7) If the storage area does not exist, the protection level judging unit 113 judges whether the two least significant bits of the additional information are "11" or not (S23).
(8) If the two least significant bits are "11", the area searching unit 112 searches for a free storage area large enough to accommodate the program acquired at the program acquiring unit 101, within the low protection level storage unit 102, in order to judge whether the low protection level storage unit 102 has such storage area (S24). If the storage area is judged not to exist, an error processing is performed.
(9) If the storage area is judged to exist, the protection level judging unit 113 determines the discovered storage area in the low protection level storage unit 102, as the storage destination (S25).
(10) If the two least significant bits are not "11", the moving unit 214 reads additional information corresponding to each of the programs stored at the high protection level storage unit 118, extracts additional information having lower priority than the additional information of the program to be currently stored, and moves the program whose additional information has lower priority to the low protection level storage unit 102, and allocates a storage area within the high protection level storage unit 118, which can store the acquired program at the program acquiring unit 101 (S26).

Here, if the program to be moved from the high protection level storage unit 118 has not had processing performed thereon by the cryptographic processing unit 117, the program to be moved, before being moved to the low protection level storage unit 102, will have MAC information added and a digital signature embedded according to the fourth least significant bit of the additional information, and will be encrypted according to the third least significant bit.

(11) If a storage area has not been allocated in the high protection level storage unit 118, a storage area will be allocated in the low protection level storage unit 102 (S27). If it is even impossible to allocate a storage area in the low protection level storage unit 102, an error processing is performed.

(12) Same operation as (15) in the first embodiment (S15).

(13) Same operation as (16) in the first embodiment (S16).

(Variations)

It should be noted here that an arrangement is also possible that additional information is stored together with the program ID in the header of the program file, and MAC information is added to and a digital signature is embedded on the entire program file including the header. In addition, the secure device, as a condition of downloading the program, may perform the authentication of the MAC information and the digital signature, or additional information may be outputted when executing the program.

In addition, in the first and second embodiments of the present invention, additional information is stored together with a program, and is used when moving the program. However, since it is unnecessary to store the additional information if the additional information will not be used because the program will not be moved. Therefore in such a case, only the program may be arranged to be stored, without its additional information.

Further, in the first and second embodiments of the present invention, there are two kinds of storage elements for storing programs, which each are different in protection level. However, there may be three or more storage elements, whose protection levels are different from each other.

In addition, in the first and second embodiments of the present invention, each program has one piece of additional information. However, one program may have two or more pieces of additional information. For example, a program is divided into a plurality of sub-programs. In such arrangement, by corresponding a piece of additional information to one sub-program, it is made possible to store only the most confidential sub-program in the storage element having high protection level, such as a sub-program directly relating to the billing processing in an accounting program. In another example, it becomes possible to divide a main routine from other sub-routines, and to add additional information to each routine. This makes reading of the meaning of the entire program hard, by storing the main routine in the storage element having high protection level, or by storing the most confidential sub-routines in the storage element having high protection level.

Furthermore, in the first and second embodiments, what is downloaded is a program, however it may be digital content or other digital data.

(Summary)

As stated above, the secure device according to the present invention provides the ability to determine the storage destination for a program based on the additional information corresponding to the program. Therefore, as for a program exceeding a capacity of the storage area mounted in the TRM, an administrator of the program is able to set the additional information, in order to ensure the security that the administrator of a program needs in downloading the program.

INDUSTRIAL APPLICABILITY

The present invention is applicable to various kinds of electronic information services such as content distribution services and mobile EC services that distribute music content and moving image content through such networks as the Internet.

The secure device according to the present invention can download a program exceeding the capacity of the storage area implemented on the TRM, while ensuring security that is required by the administrator of the program. A user of the secure device can securely enjoy content distribution services, mobile EC services, and the like, from the road, by mounting the secure device of the present invention to the mobile telephone of the user.

The invention claimed is:

1. A secure device comprising:
   a plurality of storage units each having a storage area;
   an acquiring unit operable to acquire digital data and destination information added to the digital data, the destination information specifying a protection level required for the digital data and being used for determining a storage unit as a storage destination of the digital data; and
   a processing unit operable to store the digital data in a storage unit determined based on the destination information,
   wherein each of the plurality of storage units corresponds to a protection level, the destination information specifies whether to embed a digital signature when moving and storing the digital data in a storage unit having a less secured lower protection level than a predetermined protection level, and the processing unit is operable to correspondingly embed the digital signature on the digital data before moving and storing the digital data in said lower-protection level storage unit, according to the destination information and to store the digital data only if authentication has been successful in accordance with the digital signature.

2. The secure device of claim 1,
   wherein each of the plurality of storage units corresponds to a protection level, the destination information specifies whether to encrypt the digital data before storing the digital data in a storage unit corresponding to a lower protection level than a predetermined protection level, and the processing unit is operable to selectively encrypt the digital data before storing the digital data in the lower-protection level storage unit, according to the destination information.

3. The secure device of claim 1,
   wherein each of the plurality of storage units corresponds to a protection level, the destination information specifies whether to add a message authentication code to the digital data when storing the digital data in a storage unit having a lower protection level than a predetermined protection level, and the processing unit is operable to selectively add the a message authentication code to the digital data before storing the digital data in the lower-protection level storage unit, according to the destination information.

4. The secure device of claim 1,
   wherein the digital data is either embedded in a digital signature or added to an authentication identifier, the digital signature and the authentication identifier showing either 1) correctness of the destination information, or 2) correctness of correspondence between the digital data and the destination information;
   and the processing unit is operable to perform authentication according to the digital signature or the authentication identifier, and to store the digital data only if the authentication has been successful.

* * * * *